(12) United States Patent
Sugimoto et al.

(10) Patent No.: US 7,685,166 B2
(45) Date of Patent: Mar. 23, 2010

(54) INFORMATION RECORDING APPARATUS (75) Inventors: Noriko Sugimoto, Takarazuka (JP); Kazuhiro Yamanishi, Kashiwara (JP)

(73) Assignee: Panasonic Corporation, Kadoma (JP)

( * ) Notice: Subject to any disclaimer, the term of this patent is extended or adjusted under 35 U.S.C. 154(b) by 142 days.

(21) Appl. No.: 11/333,869

(22) Filed: Jan. 18, 2006

(65) Prior Publication Data
US 2006/0161595 A1    Jul. 20, 2006

(30) Foreign Application Priority Data
Jan. 19, 2005    (JP) .............................. 2005-011204

(51) Int. Cl.
*G06F 12/00*    (2006.01)
*H04N 7/00*    (2006.01)

(52) U.S. Cl. ....................... 707/200; 707/203; 707/204; 386/94; 386/95

(58) Field of Classification Search ................. 707/200, 707/203, 204; 386/95, 94
See application file for complete search history.

(56) References Cited

U.S. PATENT DOCUMENTS

| | | | | |
|---|---|---|---|---|
| 6,034,832 | A * | 3/2000 | Ichimura et al. | 360/60 |
| 6,160,951 | A * | 12/2000 | Tozaki et al. | 386/46 |
| 6,594,740 | B1 | 7/2003 | Fukuda | |
| 6,711,343 | B1 * | 3/2004 | Matsumi et al. | 369/69 |
| 6,748,485 | B1 * | 6/2004 | Yokota et al. | 711/112 |
| 7,053,936 | B2 * | 5/2006 | Imura et al. | 386/E5.072 |
| 7,154,535 | B2 * | 12/2006 | Yamasaki et al. | 386/E5.072 |
| 7,158,713 | B2 * | 1/2007 | Goto et al. | 386/70 |
| 7,237,112 | B1 | 6/2007 | Ishiguro et al. | |
| 2001/0017828 | A1 * | 8/2001 | Yamada | 369/47.12 |
| 2001/0042043 | A1 * | 11/2001 | Shear et al. | 705/51 |
| 2002/0025138 | A1 * | 2/2002 | Isobe et al. | 386/95 |
| 2002/0094088 | A1 * | 7/2002 | Okaue | 380/278 |
| 2002/0097645 | A1 | 7/2002 | Mikawa | |

(Continued)

FOREIGN PATENT DOCUMENTS

CN    1310451    8/2001

(Continued)

OTHER PUBLICATIONS

Laplink, Laplink V User's Guide, Dec. 1993, Traveling Software, p. ii, 5.*

(Continued)

*Primary Examiner*—Vincent Boccio
(74) *Attorney, Agent, or Firm*—Renner, Otto, Boisselle & Sklar, LLP (57) ABSTRACT

There is provided an information recording apparatus which is capable of collective management concerning which content data is recorded on each one of a plurality of information storage media. The information recording apparatus includes: a content data storage section for recording content data; a management information generation section for generating management information for the management of at least one of a copy and move of the content data; and a management information storage section for recording the management information. When the content data is copied or moved to an information storage medium, the management information generation section generates management information containing: content data identification information for identifying the copied or moved content data; and information storage medium identification information for identifying the information storage medium to which the content data has been copied or moved.

9 Claims, 9 Drawing Sheets

| Number | Thumbnail | Content Data Management Information | Copy/Move Management Information |
|---|---|---|---|
| 0001 | | Title : Sports Day<br>CH: External Input<br>Recording Date/Time : 2004/10/10 09:30:00 | Copied<br>Information Storage Medium ID :A0000001<br>Name : Dad's Disk<br>Media Type : DVD-RAM |
| | | | Copied<br>Information Storage Medium ID :A0000006<br>Name : Jack's Memory Card<br>Media Type : Memory Card |
| 0002 | 3<br>Tuesday<br>Movie Special | Title : Tuesday Movie Special<br>CH: 11ch ( PQR-TV )<br>Recording Date/Time : 2004/10/30 21:00:00 | Moved<br>Information Storage Medium ID :A0000001<br>Name : Dad's Disk<br>Media Type : DVD-RAM |
| 0003 | | Title : Club Outing<br>CH: External Input<br>Recording Date/Time : 2004/11/1 8:41:06 | Copied<br>Information Storage Medium ID : A0000002<br>Name : For Mr. Tanaka<br>Media Type : DVD-RAM |
| | | | Copied<br>Information Storage Medium ID :K0000033<br>Name : Dad's Mobile Phone<br>Media Type : Mobile Phone |
| | | | Copied<br>Information Storage Medium ID :A0000001<br>Name : Dad's Disk<br>Media Type : DVD-RAM |

U.S. PATENT DOCUMENTS

| | | | |
|---|---|---|---|
| 2002/0181355 A1* | 12/2002 | Shikunami et al. | 369/47.12 |
| 2003/0031319 A1* | 2/2003 | Abe et al. | 380/232 |
| 2003/0151991 A1* | 8/2003 | Kitani et al. | 369/47.13 |
| 2003/0152359 A1 | 8/2003 | Kim | |
| 2003/0188093 A1* | 10/2003 | Hattori et al. | 711/112 |
| 2003/0215236 A1* | 11/2003 | Manifold | 398/79 |

FOREIGN PATENT DOCUMENTS

| | | |
|---|---|---|
| CN | 1437196 | 8/2003 |
| JP | 09-065279 A | 3/1997 |
| JP | 11-242873 A | 9/1999 |
| JP | 11-283325 A | 10/1999 |
| JP | 2001-117660 A | 4/2001 |
| JP | 2001-202748 A | 7/2001 |
| JP | 2002-369138 | 12/2002 |
| JP | 2003-051176 A | 2/2003 |
| JP | 2003-151242 A | 5/2003 |
| JP | 2003-151244 A | 5/2003 |

OTHER PUBLICATIONS

Office Action dated May 9, 2008 issued for the corresponding Chinese Patent Application No. 200610005007.8 and partial English translation thereof.

Notice of Reasons for Rejection for corresponding Japanese Application No. 2006-006201 dated Dec. 22, 2009 (with English translation).

* cited by examiner

FIG.1

*FIG.2* Copy/Move Management Information

| Copy/Move Management Information ID | 0001 | |
|---|---|---|
| Information Storage Medium ID | A0000001 | Information Storage Medium Identification Information |
| Information Storage Medium Name | Dad's Disk | |
| Information Storage Medium Manufacturer ID | Panasonic | |
| Information Storage Medium Type | DVD-RAM | |
| Information Storage Medium Vacant Capacity | 1.15GB | Information Storage Medium Additional Information |
| Number of Content Data | 3 | |
| Content Data ID | 0001 | Content Data Identification Information |
| Title | Sports Day | |
| Time of Extracting Content's Representative Still Picture | 00:01:00 | |
| Content's Representative Still Picture File | A001_0001.jpg | |
| Content's Representative Moving Picture File | A001_0001.mpg | |
| Copy or Move | Copy | |
| Date/Time of Copy or Move | 2004/12/01 23:40:45 | |
| Format Type | MPEG2 | |
| Comments | | |
| Content Data ID | 0002 | Content Data Identification Information |
| Title | Tuesday Movie Special | |
| Time of Extracting Content's Representative Still Picture | 00:00:10 | |
| Content's Representative Still Picture File | A000001_0001.jpg | |
| Content's Representative Moving Picture File | A000001_0001.mpg | |
| Copy or Move | Move | |
| Date/Time of Copy or Move | 2004/12/20 21:02:07 | |
| Format Type | MPEG4 | |
| Comments | | |
| Content Data ID | 0008 | Content Data Identification Information |
| Title | Club Outing | |
| Time of Extracting Content's Representative Still Picture | 00:10:36 | |
| Content's Representative Still Picture File | A00000001_0002.jpg | |
| Content's Representative Moving Picture File | A00000001_0002.mpg | |
| Copy or Move | Copy | |
| Date/Time of Copy or Move | 2004/12/02 00:01:12 | |
| Format Type | MPEG2 | |
| Comments | Kyoto-Kiyomizu Temple- | |

FIG.3

| | | |
|---|---|---|
| Information Storage Medium ID :A0000001<br>Name: Dad's Disk; Manufacturer: Panasonic; Type: DVD-RAM | | |
|  | Title : Sports Day<br>Recording Date/Time : 2004/10/10 09:30:00<br>CH: External Input<br>Copying Date/Time :2004/12/01 23:40:45 | Comments : |
| <br>Tuesday Movie Special | Title : Tuesday Movie Special<br>Recording Date/Time : 2004/10/30 21:00:00<br>CH:11ch(PQR-TV )<br>Moving Date/Time :2004/12/20 21:02:07 | Comments : |
|  | Title : Club Outing<br>Recording Date/Time : 2004/11/1 8:41:06<br>CH: External Input<br>Copying Date/Time :2004/12/02 00:01:12 | Comments :<br>Kyoto-Kiyomizu Temple- |

FIG.4A Content Data Management Information

| Content Data ID | 0001 |
|---|---|
| Title | Sports Day |
| Channel Information | External Input |
| Content Recording Date/Time Information | 2004/10/10 09:30:00 |
| Time of Extracting Content's Representative Still Picture | 00:01:00 |
| Content's Representative Still Picture File | A001_0001.jpg |
| Content's Representative Moving Picture File | A001_0001.mpg |
| Format Type | MPEG2 |
| Comments | |
| Delete Flag | 0 |
| Copy/Move Flag | 0 |
| Number_of_Copying Information | 0 |

} Content Data Identification Information

FIG.4B Content Data Management Information

| Content Data ID | 0001 |
|---|---|
| Title | Sports Day |
| Channel Information | External Input |
| Content Recording Date/Time Information | 2004/10/10 09:30:00 |
| Time of Extracting Content's Representative Still Picture | 00:01:00 |
| Content's Representative Still Picture File | A001_0001.jpg |
| Content's Representative Moving Picture File | A001_0001.mpg |
| Format Type | MPEG2 |
| Comments | |
| Delete Flag | 0 |
| Copy/Move Flag | 1 |
| Number_of_Copying Information | 2 |
| Copy/Move Management Information ID | 0001 |
| Copy/Move Management Information ID | 0006 |

} Content Data Identification Information

FIG.5

| Number | Thumbnail | Content Data Management Information | Copy/Move Management Information |
|---|---|---|---|
| 0001 | (ant figure) | Title : Sports Day<br>CH: External Input<br>Recording Date/Time : 2004/10/10 09:30:00 | Copied<br>Information Storage Medium ID : A0000001<br>Name : Dad's Disk<br>Media Type : DVD-RAM<br><br>Copied<br>Information Storage Medium ID : A0000006<br>Name : Jack's Memory Card<br>Media Type : Memory Card |
| 0002 | 3<br>Tuesday Movie Special | Title : Tuesday Movie Special<br>CH:11ch( PQR-TV )<br>Recording Date/Time :2004/10/30 21:00:00 | Moved<br>Information Storage Medium ID : A0000001<br>Name : Dad's Disk<br>Media Type : DVD-RAM |
| 0003 | (figures) | Title : Club Outing<br>CH: External Input<br>Recording Date/Time : 2004/11/1 8:41:06 | Copied<br>Information Storage Medium ID : A0000002<br>Name : For Mr. Tanaka<br>Media Type : DVD-RAM<br><br>Copied<br>Information Storage Medium ID : K0000033<br>Name : Dad's Mobile Phone<br>Media Type : Mobile Phone<br><br>Copied<br>Information Storage Medium ID : A0000001<br>Name : Dad's Disk<br>Media Type : DVD-RAM |

| Number | Thumbnail | Content Data Management Information | Copy/Move Management Information |
|---|---|---|---|
| 0001 | 3<br>Tuesday Movie Special | Title : Tuesday Movie Special<br>CH:11ch ( PQR-TV )<br>Recording Date/Time :2004/10/30  21:00:00 | Moved<br>Information Storage Medium ID :KK00A11<br>Name :Jack<br>Media Type : Mobile Terminal |
| 0002 | ABCD Special | Title : ABCD Special<br>CH:9ch (XYZ-TV)<br>Recording Date/Time :2004/12/06  04:58:00 | Moved<br>Information Storage Medium ID : B0000021<br>Name : Temporary<br>Media Type :DVD-RAM |
| 0003 | ⇄ | Title : Movie 12345<br>CH:333ch (Specialty Channel)<br>Recording Date/Time :2004/12/17  19:00:00 | Deleted from Here<br>No Copy/Move Destination Found |
| 0004 | ☺ | Title : Comic Time<br>CH:122ch (Funny Channel)<br>Recording Date/Time :2004/12/19  01:59:00 | Moved<br>Information Storage Medium ID : KK00A21<br>Name : Jill<br>Media Type : Mobile Terminal |

| | ID | Name | Vacant Capacity [GB] |
|---|---|---|---|
| 1 | A00001 | Dad's Disk | 1.33 |
| 2 | A00087 | Movie 2 | 1.35 |
| 3 | K99942 | Jill | 1.35 |
| 4 | HU00002 | Dad's Disk 2 | 3.11 |
| 5 | JJ98732 | Family Trip | 3.13 |
| 6 | DD987FJ | Mom's Dramas | 4.29 |
| 7 | GF09SD | Temporary 1 | 4.70 |

List of Vacant Capacity Search Results

INFORMATION RECORDING APPARATUS

BACKGROUND OF THE INVENTION

1. Field of the Invention

The present invention relates to an information recording apparatus for managing copying and moving of content data.

2. Description of the Related Art:

Information recording apparatuses which incorporate a large-capacity information storage medium such as a HDD (Hard Disk Drive) are gaining prevalence. In such an information recording apparatus, content data management information to be used for the management of recorded content data is generated and recorded in an HDD. The content data management information represents, for example, program name information, program's cast information, channel information, and the number of times each program has been played back. Presenting the management information to a user facilitates the user's management of content data (see, for example, Japanese Laid-Open Patent Publication No. 2002-369138).

When data of a certain content has been recorded to a removable medium such as an optical disk medium or a semiconductor memory card, what is commonly practiced in order to indicate that the particular content data is recorded on that removable medium is to attach a label on the removable medium surface, for example, and write down the particulars of the recording with a pen or the like.

However, it is difficult to write in length on such a removable medium surface. Moreover, it would be very cumbersome to always describe the latest information on the surface of a rewritable information storage medium.

When copy-once content data (e.g. digital broadcast content data whose copying is prohibited) is moved from an information recording apparatus to an information storage medium, it will become difficult, as the user's memory fades, to remember which information storage medium the particular data has been moved to.

Moreover, as the number of information storage media in the user's possession increases, it will become more cumbersome for the user to take each such information storage media in his or her hand to examine whether it is the very information storage medium on which the desired content data is recorded.

Furthermore, in the case where a piece of content data has been deleted from the HDD of an information recording apparatus, it is up to the user's own effort as to how well the user can keep track of whether the content data has been completely deleted (and therefore is no longer existent), or copied onto another information storage medium.

SUMMARY OF THE INVENTION

In order to overcome the problems described above, preferred embodiments of the present invention provide an information recording apparatus that realizes collective management concerning which content data is recorded on each one of a plurality of information storage media.

An information recording apparatus according to the present invention comprises: a content data storage section for recording content data; a management information generation section for generating management information for the management of at least one of a copy and move of the content data; and a management information storage section for recording the management information, wherein, when the content data is copied or moved to an information storage medium, the management information generation section generates management information containing: content data identification information for identifying the copied or moved content data; and information storage medium identification information for identifying the information storage medium to which the content data has been copied or moved.

In one embodiment, even after the content data is deleted from the content data storage section, the management information storage section retains the management information concerning the content data.

In one embodiment, the information recording apparatus further comprises a detection section for detecting a state of content data recorded on the information storage medium, wherein, when the detected state of the content data differs from what is described in the management information, the management information generation section updates the management information so as to reflect the detected state of the content data.

In one embodiment, the management information indicates a vacant capacity of the information storage medium; and the information recording apparatus further comprises a vacant capacity information generation section for, when the management information storage section stores management information concerning each of a plurality of information storage media, generating vacant capacity information for displaying the respective vacant capacities of the information storage media in a predetermined order.

In one embodiment, the information recording apparatus further comprises a content data management information generation section for generating content data management information for the management of content data, wherein the content data management information includes information indicating whether the content data has ever been copied or not and a number of instances of copying the content data.

In one embodiment, the information recording apparatus further comprises a content data management information generation section for generating content data management information for the management of content data, wherein the content data management information includes information indicating whether the content data has ever been moved or not.

In one embodiment, the management information indicates at least one of: a date and time of copying or moving the content data to the information storage medium; a format type of the content data after being copied or moved; a representative still picture representing a portion of the content data; representative moving pictures representing a portion of the content data; a type of the information storage medium; a vacant capacity of the information storage medium; and a number of content data recorded on the information storage medium.

In one embodiment, the information storage medium identification information includes at least one of text, a symbol, and an icon having been arbitrarily set by a user.

In one embodiment, the information recording apparatus further comprises an output section for outputting the management information to outside of the information recording apparatus.

According to the present invention, when content data is copied or moved from the information recording apparatus to an information storage medium, management information is generated which contains content data identification information for identifying the copied or moved content data and identification information for identifying the information storage medium to which the content data has been copied or moved, and the management information is recorded to the management information storage section. Therefore, it is possible, on the information recording apparatus, to realize management concerning which piece of content data has been copied or moved, and which information storage medium the content data has been copied or moved. Therefore, by simply accessing the information recording apparatus, the user can easily identify any piece of content data that has been copied or moved, and an information storage medium to which the content data has been copied or moved. It is also easy to identify which content data is recorded on a given information storage medium. Moreover, since collective management as to which content data is recorded on each of a plurality of information storage media is realized on a single information recording apparatus, the user can easily grasp the entire library of content data and information storage media in his or her possession, by simply accessing the information recording apparatus.

In one embodiment of the present invention, even after a piece of content data is deleted from the information recording apparatus, the information recording apparatus retains management information concerning the delete content data. As a result, it is easy to confirm whether a piece of content data which has been deleted from the information recording apparatus has totally been erased for good or is still existent on another information storage medium to which it has been copied or moved, by simply accessing the information recording apparatus.

In one embodiment of the present invention, the state of a given piece of content data recorded on the information storage medium is detected, and if the detected state of the content data differs from what is described in the management information, the management information is updated so as to reflect the detected state of the content data. If there has been any change in the state of a given piece of content data at the information storage medium which is a destination of copying or moving (e.g. deletion, editing, or further copy/move), the management information which is retained in the information recording apparatus is updated, whereby management information will reflect its latest state.

In one embodiment of the present invention, the information recording apparatus generates vacant capacity information for displaying the respective vacant capacities of a plurality of information storage media in a predetermined order. The vacant capacity information may list the information storage media in descending order of vacant capacity, for example. As a result, by checking the vacant capacity information, the user can easily identify those information storage media to which desired content data can be copied or moved.

In one embodiment of the present invention, the information recording apparatus retains information indicating whether the content data has ever been copied or not and a number of instances of copying the content data. As a result, by simply accessing the information recording apparatus, the user can easily know whether a piece of content data has ever been backed up, and how many times such backups have been made.

In one embodiment of the present invention, the management information indicates a representative still picture and/or representative moving pictures representing a portion of the content data. As a result, the user is able to identify content data not only via text information but also via image information, whereby a more intuitive and simple management of content data can be realized.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, an embodiment of an information recording apparatus according to the present invention will be described with reference to the accompanying drawings.

Figure 1:
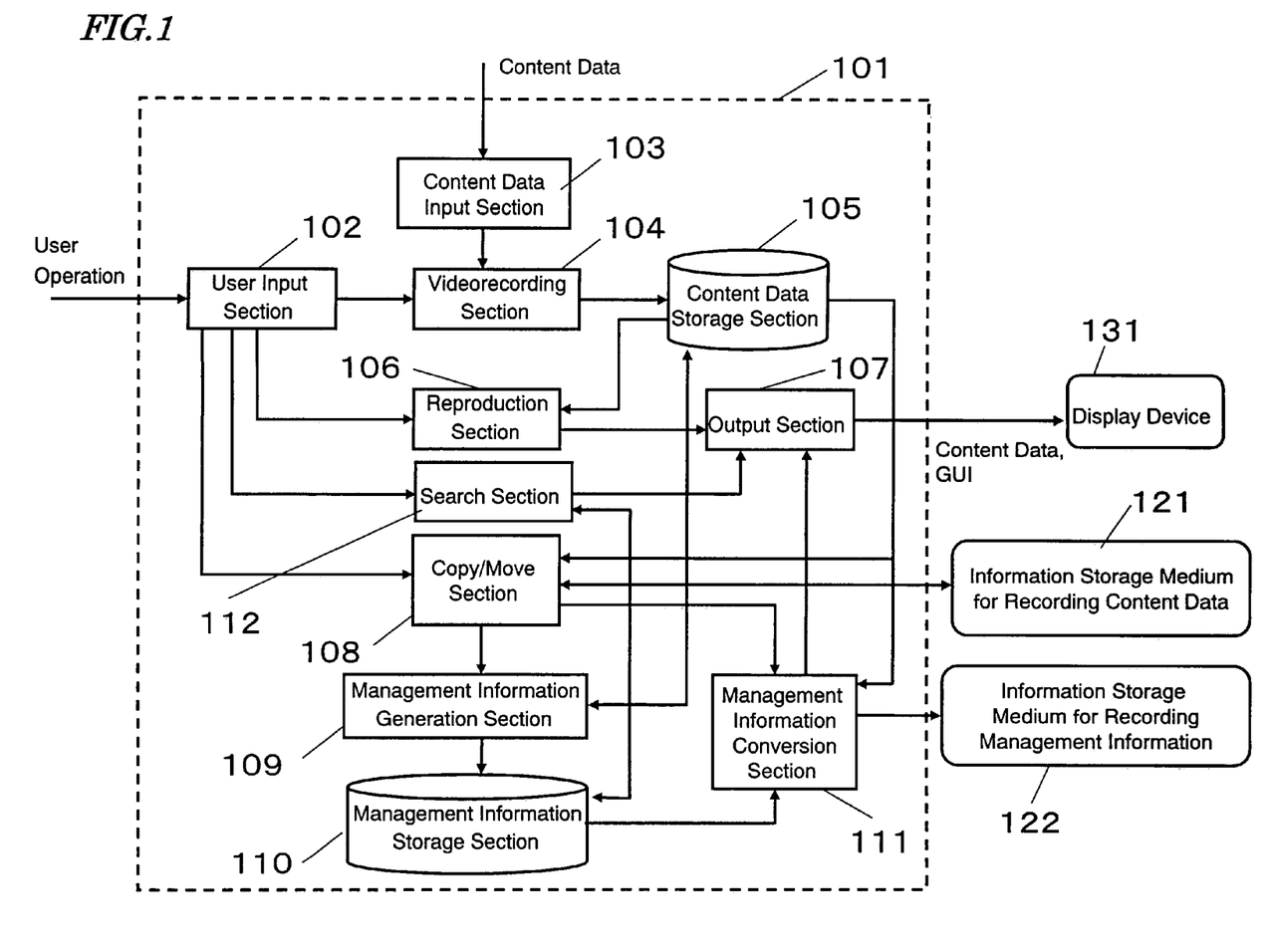
FIG. 1 is a block diagram schematically showing an information recording apparatus according to an embodiment of the present invention.

First, with reference to FIG. 1, an information recording apparatus 101 of the present embodiment will be described. FIG. 1 is a block diagram schematically showing the information recording apparatus 101. The information recording apparatus 101 comprises: a user input section 102 for receiving a command from a user; a content data input section 103 for receiving content data which is externally provided; a content data storage section 105 for storing content data; a videorecording section 104 which outputs the content data received by the content data input section 103 to the content data storage section 105 for recording; a reproduction section 106 for reproducing content data which is stored in the content data storage section 105; and an output section 107 for outputting the content data which has been output from the reproduction section 106 to the outside, e.g., a display device 131. The content data input section 103 receives content data from, for example: a broadcast wave which is sent from a broadcast station or the like; the Internet; or an external device such as a video camera or a set-top box (STB). As used herein, "content data" includes at least one of video data and audio data. The videorecording section 104 converts the data format of the received content data as necessary, and outputs the content data to the content data storage section 105. The content data storage section 105 is an information storage medium having a large capacity, e.g., an HDD. When storing the content data to the content data storage section 105, the videorecording section 104 generates content data management information for use with management of content data, and records the content data management information to the content data storage section 105 in association with the content data. The content data management information represents, for example, program name information, program's cast information, channel information, and the number of times the program has been played back.

Figure 4A:
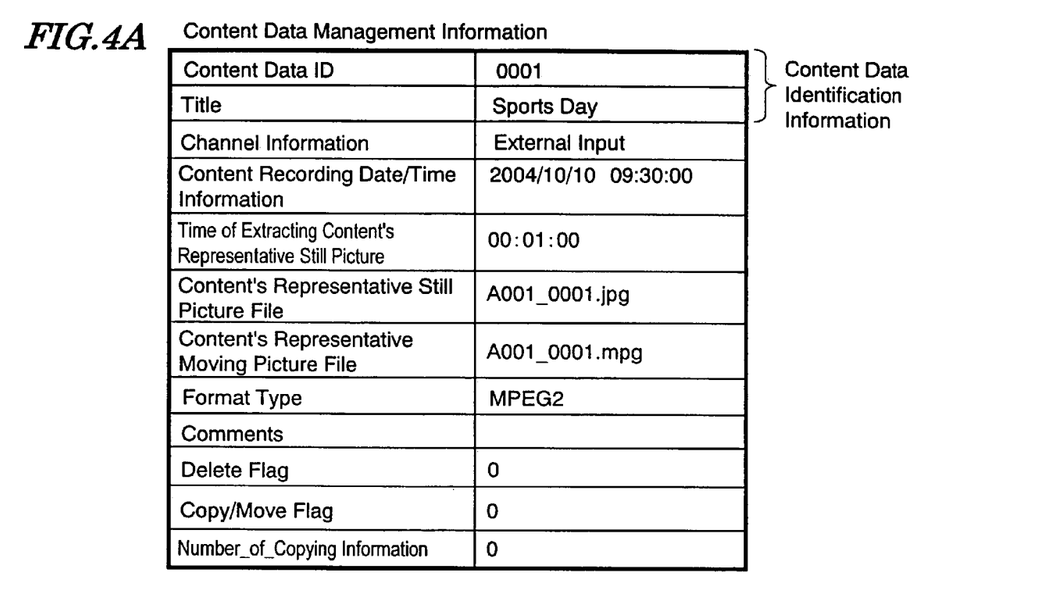
FIG. 4A is a diagram showing content data management information according to an embodiment of the present invention.

With reference to FIG. 4A, content data management information which is used for the management of content data will be described. FIG. 4A is a diagram showing an example of content data management information.

Content data management information is generated by the videorecording section 104, and is recorded in the content data storage section 105 in association with the content data. Although conveniently omitted from illustration, the content data management information may represent, as mentioned above, program name information, program's cast information, the number of times the program has been played back, and the like.

With reference to FIG. 4A, each piece of content data management information includes content data identification information for identifying content data. The content data identification information represents a content data ID, which is an identifier unique to the content data, and the title of the content data.

In association with the content data identification information, the content data management information includes: content recording date/time information indicating the date and time that the content data was recorded by the information recording apparatus 101; channel information indicating a source of the content data; the content's representative still picture file, which represents a portion of the content data; the content's representative moving picture file, which represents a portion of the content data; information indicating the time at which the content's representative still picture was extracted from the content data; information indicating the data format type of the content data; and information indicating the user's comments regarding the content data.

The content's representative still picture may be an image taken from the beginning of the content data, or an image which is extracted at an arbitrary point in time from the content data. The content's representative moving picture may be moving pictures starting from the beginning of the content data, or moving pictures which are extracted from an arbitrary section of the content data. Alternatively, the content's representative moving picture may be a digest video which combines a plurality of scenes from the content data. The title indicated by the content data identification information and the user's comments regarding the content data may be in any format which includes at least one of text, a symbol, and an icon having been arbitrarily set by the user.

The content data management information includes a delete flag indicating whether the content data has been deleted or not. When the content data received by the content data input section 103 (FIG. 1) has just been recorded by the videorecording section 104 to the content data storage section 105, no deletion has been executed yet, and therefore the delete flag is "0", indicating that no deletion has been done. The content data management information also includes a copy/move flag indicating whether or not the content data has ever been copied/moved, and number_of_copying information indicating the number of times that copying has been executed. When the content data received by the content data input section 103 (FIG. 1) has just been recorded by the videorecording section 104 to the content data storage section 105, no copying or moving has been executed yet, and therefore the copy/move flag is "0", indicating that neither copy nor move has been done. The number_of_copying information is also "0", indicating that no copying has been done.

Referring back to FIG. 1, the information recording apparatus 101 further comprises a copy/move section 108, a management information generation section 109, a management information storage section 110, and a management information conversion section 111. Based on a user command which is given via the user input section 102, the copy/move section 108 copies or moves the content data which is stored in the content data storage section 105, to an information storage medium 121 intended for recording content data. The information storage medium 121 may be an optical disk medium, a semiconductor memory, a magnetic tape medium, an HDD, a mobile phone, a mobile terminal device, or the like. An example of an optical disk medium is a DVD (Digital Versatile Disc)-RAM. In the present invention, an "information storage medium" refers not only to a removable medium such as an optical disk medium, but also to any apparatus that is capable of data recording, e.g., a mobile terminal device or a non-portable type information recording apparatus.

The management information generation section 109 generates copy/move management information for the management of copying and moving of content data. When a piece of content data has been copied by the copy/move section 108 to the information storage medium 121, the management information generation section 109 generates a piece of copy/move management information which contains: content data identification information for identifying the particular content data that has been copied; and information storage medium identification information for identifying the information storage medium 121 as a copying destination of the content data. These two kinds of information are kept in association in the generated copy/move management information. Moreover, when a piece of content data has been moved by the copy/move section 108 to the information storage medium 121, the management information generation section 109 generates a piece of copy/move management information which contains: content data identification information for identifying the particular content data that has been moved; and information storage medium identification information for identifying the information storage medium 121 as a moving destination of the content data. These two kinds of information are kept in association in the generated copy/move management information. The management information storage section 110 (which may be an HDD, for example) stores the copy/move management information. At the same time, the management information generation section 109 reads the content data management information which is recorded in the content data storage section 105 and updates it so that the content data management information reflects any copying or moving that has been executed.

Figure 2:
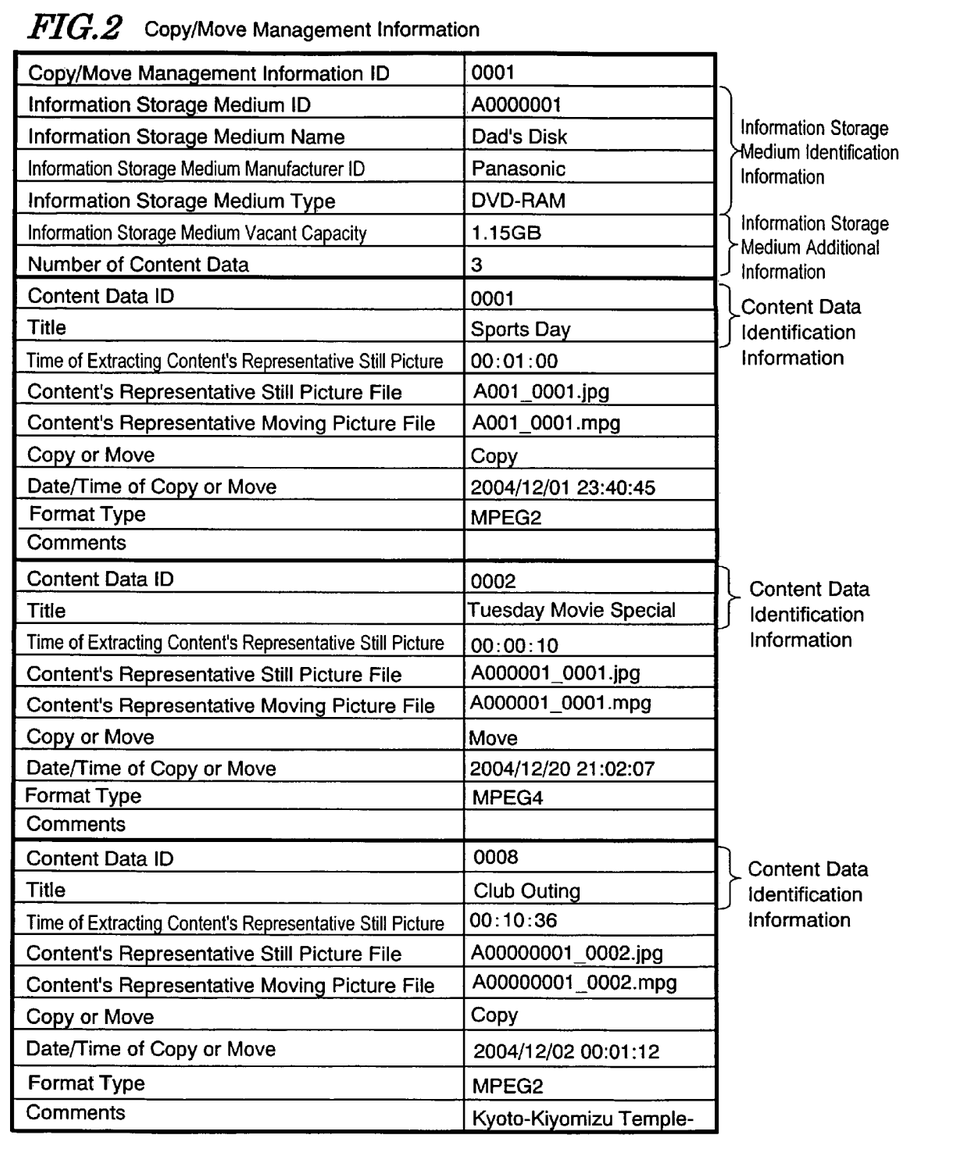
FIG. 2 is a diagram showing copy/move management information according to an embodiment of the present invention.

With reference to FIG. 2, the copy/move management information will be described. FIG. 2 is a diagram showing an example of copy/move management information.

The copy/move management information includes: a copy/move management information ID, which is a unique identifier for identifying the copy/move management information; information storage medium identification information for identifying an information storage medium which is a destination of copying or moving of the content data; and content data identification information for identifying each piece of content data that has been copied or moved.

The information storage medium identification information includes: an information storage medium ID, which is a unique identifier of an information storage medium; an information storage medium name indicating a name which is unique to the information storage medium; an information storage medium manufacturer ID indicating the manufacturer of the information storage medium; and an information storage medium type indicating the type of the information storage medium. In association with the information storage medium identification information, the copy/move management information also contains information storage medium additional information. The information storage medium additional information includes: information indicating the vacant capacity of the information storage medium; and information indicating the number of content data that are recorded on the information storage medium.

The copy/move management information further includes: content data identification information of each piece of content data that has been copied or moved; the content's representative still picture file; the content's representative moving picture file; information indicating the time at which the content's representative still picture was extracted; and information indicating the user's comments regarding the content data. These kinds of information have been extracted by the management information generation section 109 from the content data management information (FIG. 4A), and added to the copy/move management information.

Moreover, in association with each piece of content data identification information, the copy/move management information includes: information indicating whether the recording of the content data has occurred in the form of a copy or a move; information indicating the date and time that the copy or move was executed; and information indicating the data format type of the content data after the copy or move.

Figure 4B:
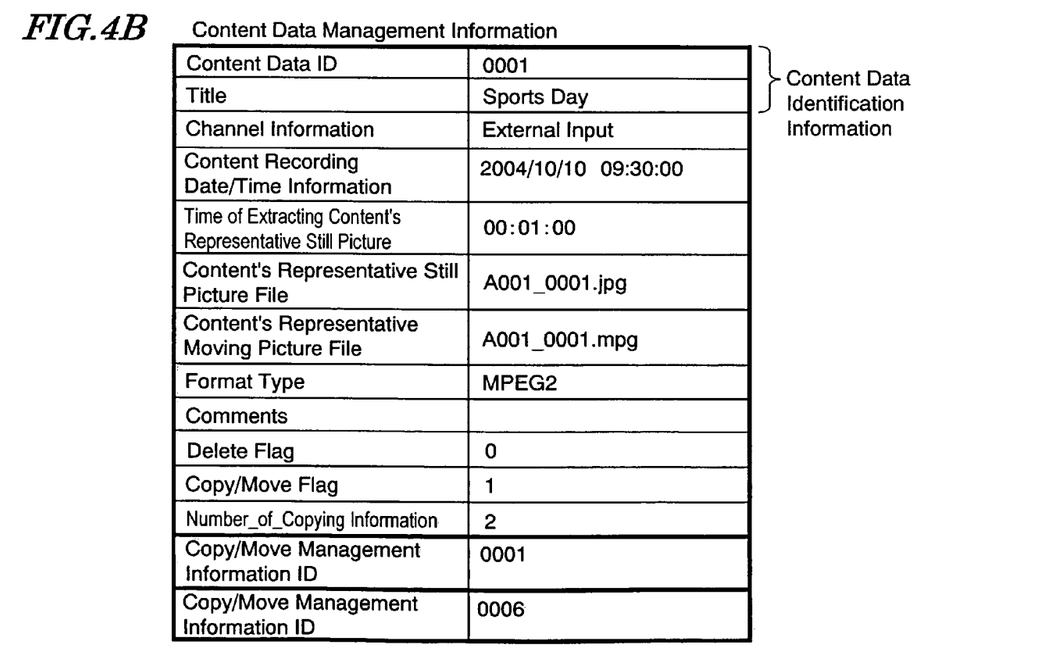
FIG. 4B is a diagram showing content data management information according to an embodiment of the present invention, which reflects copying or moving that has been executed.

Next, with reference to FIG. 4B, a piece of content data management information which reflects copying or moving that has been executed will be described. FIG. 4B is a diagram showing an example of content data management information which reflects copying or moving that has been executed. The management information generation section 109 (FIG. 1) reads the content data management information which is recorded in the content data storage section 105 and updates it so that the content data management information reflects any copying or moving that has been executed.

Referring to FIG. 4B, the copy/move flag has been updated to "1", indicating that a copy or move has been executed. Moreover, the number_of_copying information has been updated to "2", indicating that copying has been executed twice. Furthermore, the content data management information contains copy/move management information IDs, each of which identifies a piece of copy/move management information that corresponds to a copy or move of content data. Since two instances of copying have been performed in the example shown in FIG. 4B, the content data management information contains two copy/move management information IDs.

Referring back to FIG. 1, the management information conversion section 111 converts the copy/move management information stored in the management information storage section 110 so as to have a format which is suitable for displaying on the display screen 131, e.g., a GUI (Graphical User Interface), and outputs the copy/move management information to the output section 107. Moreover, the management information conversion section 111 converts the copy/move management information stored in the management information storage section 110 so as to have a data format which is suitable for recording onto an information storage medium 122 which is intended for recording management information, and records the copy/move management information onto the information storage medium 122 which is intended for recording management information. The output section 107 outputs the copy/move management information to the display section 131, and the display section 131 displays the copy/move management information in the form of a GUI, for example.

The management information conversion section 111 may convert the copy/move management information to the HTML format or the DVD-Video format, for example, and output such copy/move management information to the output section 107 and the information storage medium 122. By converting the copy/move management information to the HTML format, it becomes possible for the user to view the copy/move management information on a personal computer as a kind of library information to show which content data has been copied or moved onto the information storage medium intended for recording content data, or utilize the copy/move management information on a mobile phone or information terminal that has an HTML browser. In addition, by uploading HTML-ized data of the copy/move management information on the Web, it becomes easy to place the user's own video library on public view via the Internet.

By converting the copy/move management information to the DVD-Video format, it becomes possible for the user to view the copy/move management information as a kind of library information, accompanied with a representative still picture and/or representative moving pictures, to show which content data has been copied or moved onto the information storage medium intended for recording content data. For example, DVD-Video containing copy/move management information of a TV program may be generated, and by utilizing such a DVD-Video as an index, the user is able to select a program to play back, and also know which information storage medium has that particular program copied or moved thereon.

Furthermore, by copying the copy/move management information that is recorded on the information recording apparatus 101 to another information storage medium, it becomes possible, even when the information recording apparatus is to be replaced by a newly-bought product, to pass the copy/move management information onto the new information recording apparatus.

Figure 3:
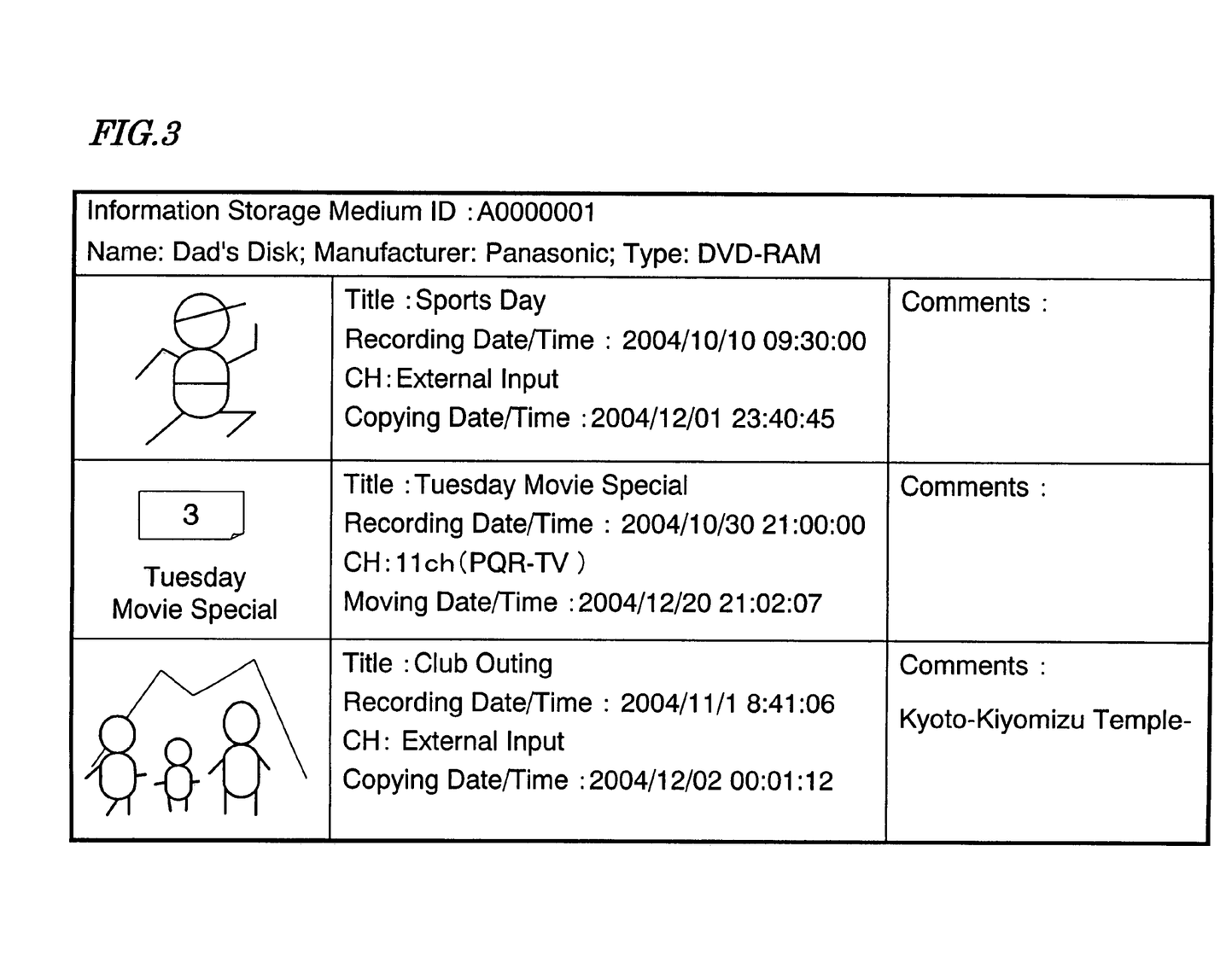
FIG. 3 is a diagram showing copy/move management information according to an embodiment of the present invention, which is displayed as a GUI.

Next, with reference to FIG. 3, an example of copy/move management information which is displayed on the display device 131 (FIG. 1) as a GUI will be described. FIG. 3 is a diagram showing copy/move management information which is displayed as a GUI.

In this example, the management information conversion section 111 converts the copy/move management information to a GUI format. The converted copy/move management information is output to the display section 131 via the output section 107, so as to be displayed on the display section 131.

Referring to FIG. 3, this information storage medium is identified by an information storage medium ID "A0000001", an information storage medium name "Dad's Disk", an information storage medium manufacturer ID "Panasonic", and an information storage medium type "DVD-RAM". This GUI shows that three pieces of content data have been copied or moved onto the information storage medium. The information which represents each piece of content data in the GUI may be any information contained in the copy/move management information, or information which has been extracted by reading the copy/move management information.

Thus, by simply designating a specific information storage medium in the displayed copy/move management information, the user is able to confirm which content data is recorded on that medium, without having to actually run the information storage medium.

By allowing the user to designate a specific information storage medium not only via the information storage medium ID but also via the information storage medium name, the information storage medium manufacturer ID or the information storage medium type, and displaying such information, designation and identification of a specific information storage medium can be even more facilitated. Especially in the case of an information storage medium whose disk surface does not bear an information storage medium ID (e.g. a DVD-R), allowing the information storage medium to be designated from various perspectives effectively facilitates the designation and identification of the information storage medium.

Figure 5:
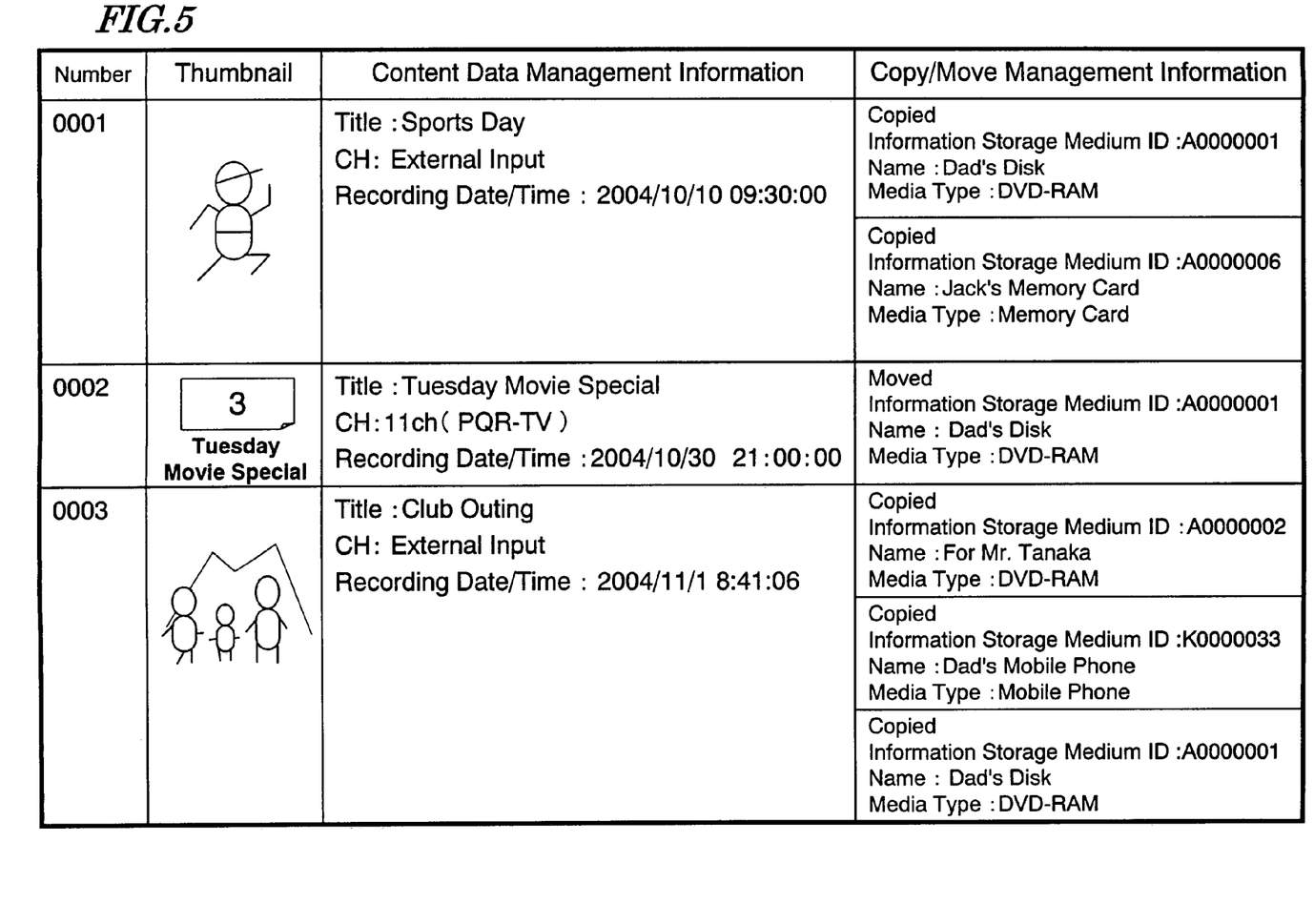
FIG. 5 is a diagram showing a GUI which is generated by combining content data management information and copy/move management information according to an embodiment of the present invention.

Next, with reference to FIG. 5, an example of content data management information and copy/move management information which are displayed on the display device 131 (FIG. 1) as a GUI will be described. FIG. 5 is a diagram showing content data management information and copy/move management information which are displayed as a GUI.

The management information conversion section 111 reads each piece of content data management information as well as any pieces of copy/move management information which correspond to the copy/move management information IDs contained in that content data management information, and combines them. The management information conversion section 111 converts the combined information so as to have a format which is suitable for displaying on the display screen 131, e.g., a GUI, and the output section 107 outputs the combined information to the display section 131. The display section 131 displays the combined information as a GUI, for example.

By combining the content data management information and the copy/move management information and displaying them as a GUI, it becomes possible for the user to see, by checking the GUI, whether the content data of interest has been copied or moved or not and which information storage medium such copying or moving has been performed to. In this example, the user will see that the content data of the title "Sports Day" (content data ID "0001") has already been copied, to two copying destinations: an information storage medium whose name is "Dad's Disk" (information storage medium ID "A0000001"), and an information storage medium whose name is "Jack's memory card" (information storage medium ID "A0000006").

Notably, it is important to keep backups of precious content data, e.g. video images which have been personally taken. The present invention makes it possible to know whether any given content data has already been backed up or not, and which information storage medium such backup may have been performed to.

By displaying the aforementioned information in such a manner that the relevant information storage medium can be identified not only via the information storage medium ID, but also via the information storage medium name, the information storage medium type or the information storage medium manufacturer ID (not shown), the identification of the information storage medium can be even more facilitated. Especially in the case of an information storage medium whose disk surface does not bear an information storage medium ID (e.g. a DVD-R), the ability to display the information for identifying the information storage medium from various perspectives effectively facilitates the identification of the information storage medium.

Although an example has been illustrated where a GUI is generated by combing content data management information and copy/move management information, a similar GUI may be generated by just combining pieces of copy/move management information, without using any content data management information at all.

Next, with reference to FIGS. 6 to 8, an updating process for the copy/move management information and content data management information in the case where moving of content data has been performed a plurality of times will be described.

Figure 6:
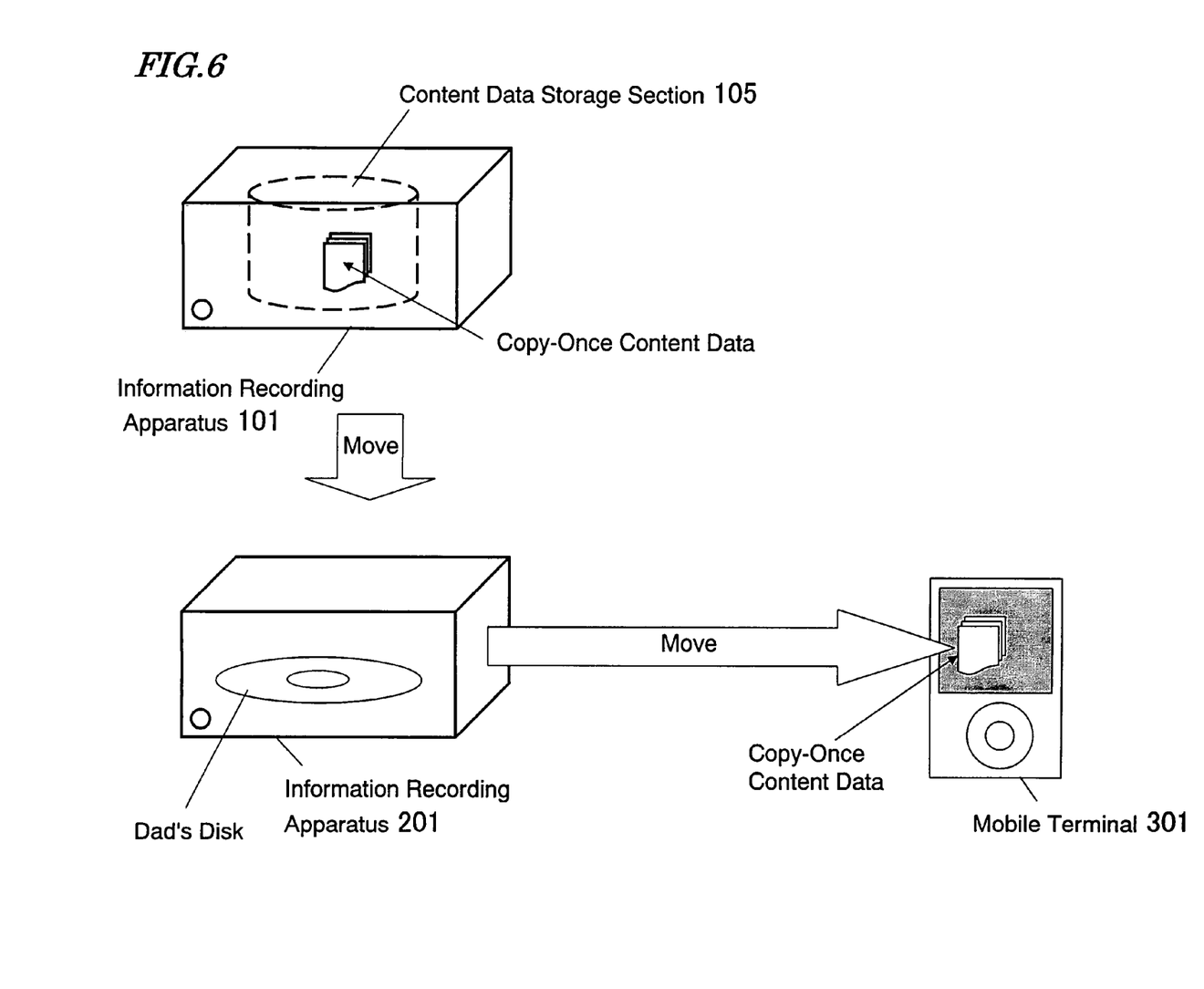
FIG. 6 is a diagram showing a state where content data has been moved a plurality of times according to an embodiment of the present invention.

FIG. 6 is a diagram showing a state where content data has been moved a plurality of times. The content data may be copy-once content data whose "copying" (as opposed to "moving") after recording is prohibited, e.g., content data which is obtained from a digital broadcast, for example. It is assumed that the copy-once content data moved herein is a piece of content data shown in FIG. 5 whose title is "Tuesday Movie Special". In the example illustrated in FIG. 6, this piece of content data is moved from the content data storage section 105 in the information recording apparatus 101 to the information storage medium "Dad's Disk", and thereafter further moved to a mobile terminal 301 via an information recording apparatus 201. In such a case, it is desirable to update the copy/move management information and content data management information so as to reflect the latest moving destination of the content data.

Figure 7:
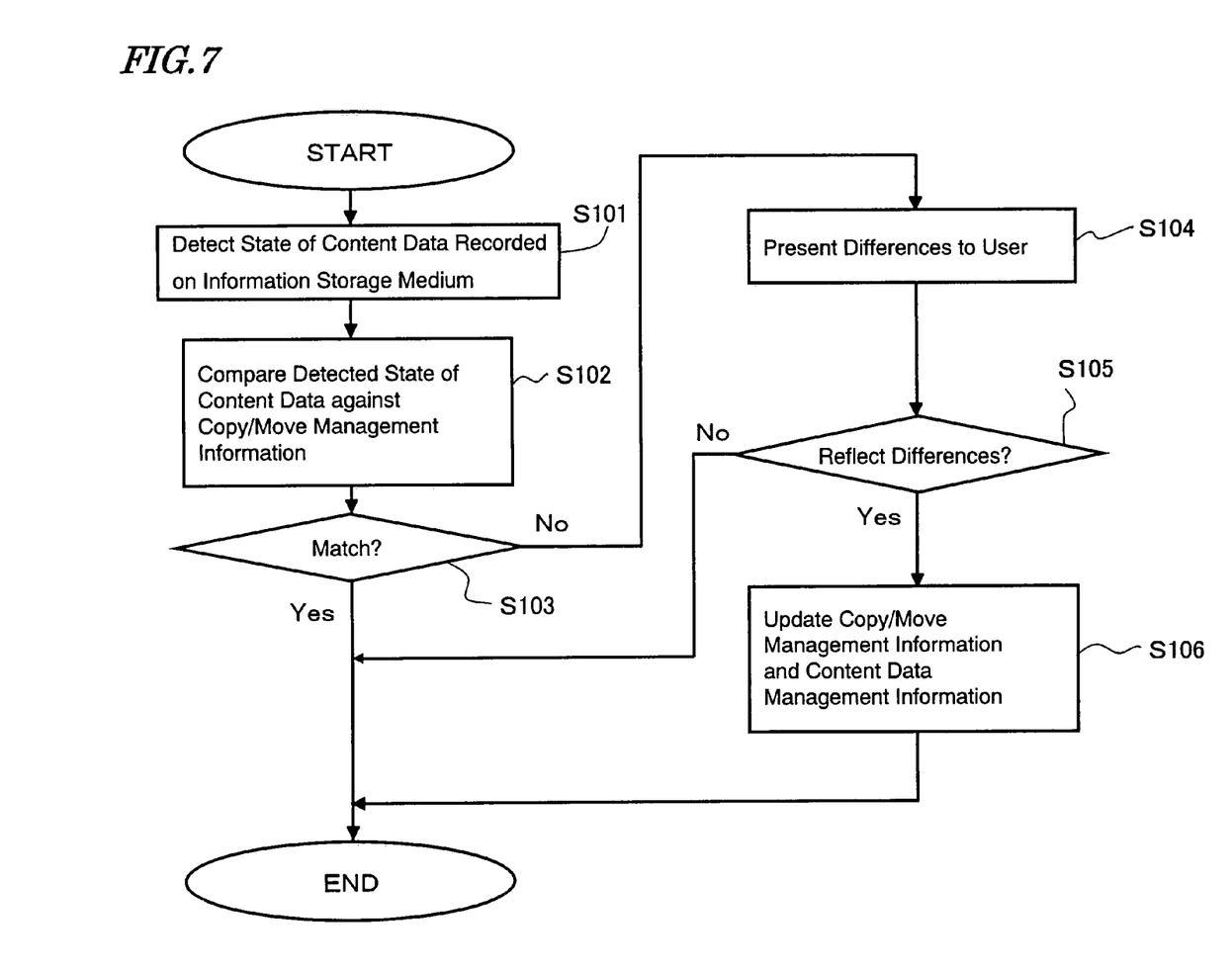
FIG. 7 is a flowchart showing an updating process of copy/move management information and content data management information according to an embodiment of the present invention.

FIG. 7 is a flowchart showing an updating process for the copy/move management information and content data management information.

The management information generation section 109 (FIG. 1) functions also as a detection section for detecting the state of each piece of content data which is recorded on the information storage medium. Referring to FIG. 7, when the information storage medium "Dad's Disk" is mounted to the information recording apparatus 101, for example, a recording/reproduction section (not shown) of the information recording apparatus reads information which is recorded on the information storage medium. From the information that has been read, the management information generation section 109 detects the state of the relevant piece of content data which is recorded on the information storage medium (S101).

Moreover, when the information recording apparatus 101 is connected to the mobile terminal 301, the management information generation section 109 detects the state of each piece of content data which is recorded in the mobile terminal 301. Such connection between the information recording apparatus 101 and the mobile terminal 301 is realized via communication means such as direct coupling, wired connections, Internet connections, telephone lines, or wireless connections. In the case where there has been a change in the state of the content data which is recorded in the mobile terminal 301, the mobile terminal 301 may, via the aforementioned communication means, automatically inform the information recording apparatus 101 of the change.

The management information generation section 109 compares the detected state of the content data against what is described in the copy/move management information (S102). If the detected state of the content data matches what is described in the copy/move management information (Yes from S103), the copy/move management information does not need to be updated because it represents the latest state of the content data, and therefore the process is ended. If they do not match (No from S103), the differences between them are presented to the user (S104). If the user instructs to update the copy/move management information and content data management information so as to reflect the latest state of the content data as detected (Yes from S105), the management information generation section 109 updates the copy/move management information and content data management information accordingly (S106). If the user does not instruct to update (No from S105), the updating process is ended. Note that such an updating process may be automatically performed independently of the user's will.

Figure 8:
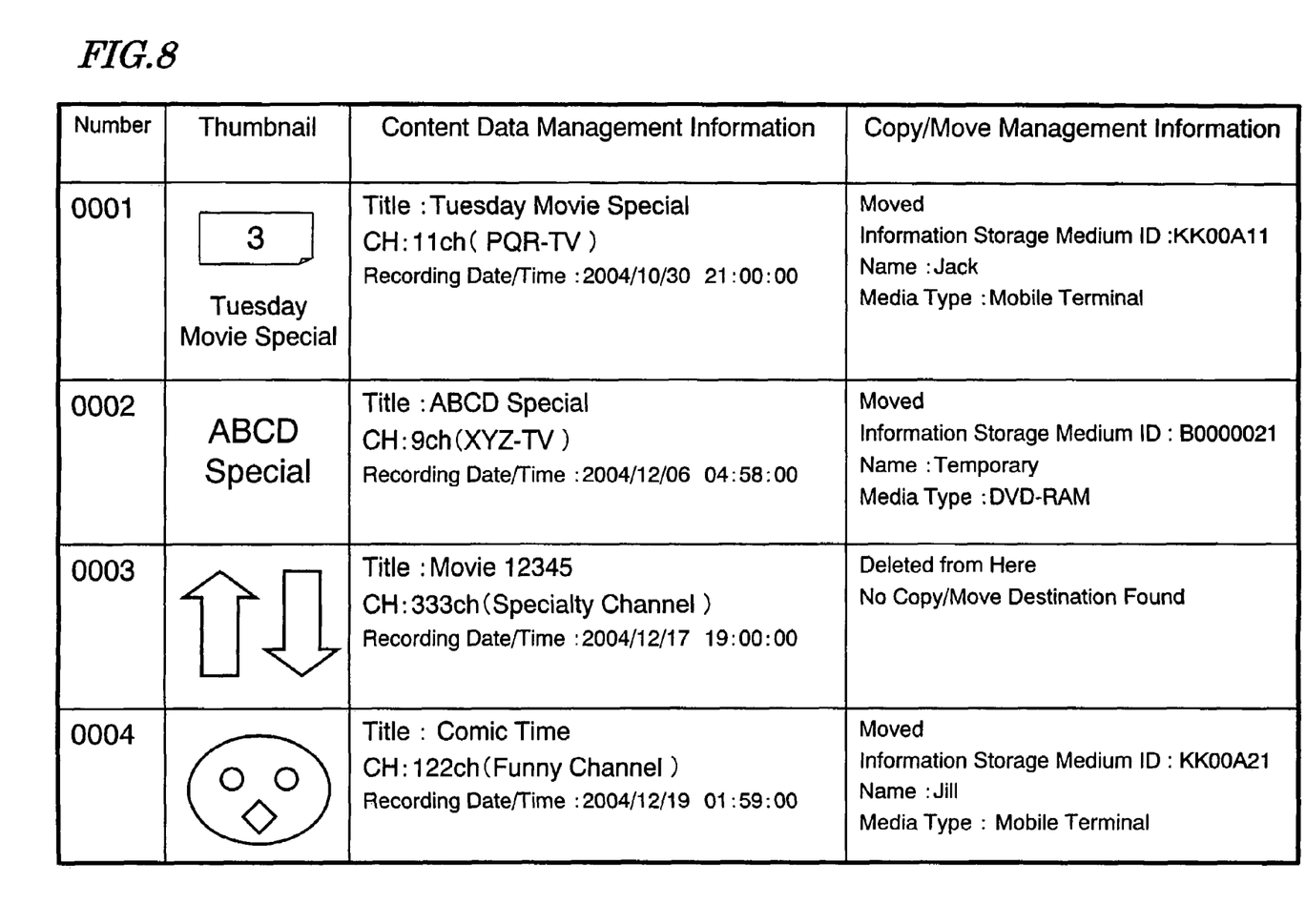
FIG. 8 is a diagram showing a GUI which is generated by combining content data management information and copy/move management information according to an embodiment of the present invention.

FIG. 8 shows an exemplary GUI which is generated by combining the content data management information and copy/move management information. In this example, the content data of the title "Tuesday Movie Special" has been moved from the information storage medium "Dad's Disk" to the mobile terminal "Jack" 301, and therefore the description of the copy/move management information has been updated so as to reflect that change.

Thus, if there has been any change in the state of a given piece of content data at the information storage medium which is a copying destination or moving destination (e.g. deletion, editing, or further copy/move), the copy/move management information and content data management information which is retained in the information recording apparatus 101 is preferably updated, whereby the copy/move management information and content data management information will reflect their latest states.

When a given piece of content data is moved, the original content data which was stored in the content data storage section 105 is deleted. In other cases, the user may decide to delete content data from the information recording apparatus 101 on his or her own will. Even if content data is deleted from the content data storage section 105, the content data storage section 105 and the management information storage section 110 will retain (rather than delete) the content data management information and copy/move management information concerning the deleted content data. Also, the management information generation section 109 (FIG. 1) sets the delete flag in the content data management information to "1", indicating that the content data has been deleted. As a result, by simply accessing the information recording apparatus 101, the user can easily confirm whether a piece of content data which has been deleted from the information recording apparatus 101 has totally been erased for good or is still existent on another information storage medium to which it has been copied or moved.

For example, referring to FIG. 8 (as is exemplified by the content data with the title "Movie 12345"), with respect to any piece of content data that has been deleted from the information recording apparatus 101 without being copied or moved, information indicating this fact is presented in the GUI to the user. For any content data that has been deleted from the information recording apparatus 101 but has been copied or moved, information for identifying an information storage medium which is the copying destination or moving destination is indicated in the GUI.

Thus, by always updating the copy/move management information and content data management information to their latest states, and retaining the copy/move management information and content data management information, it becomes possible to prevent problems such as losing track of any content data that has been moved, or inadvertently buying a piece of content data which the user has already bought but forgotten about.

Figure 9:
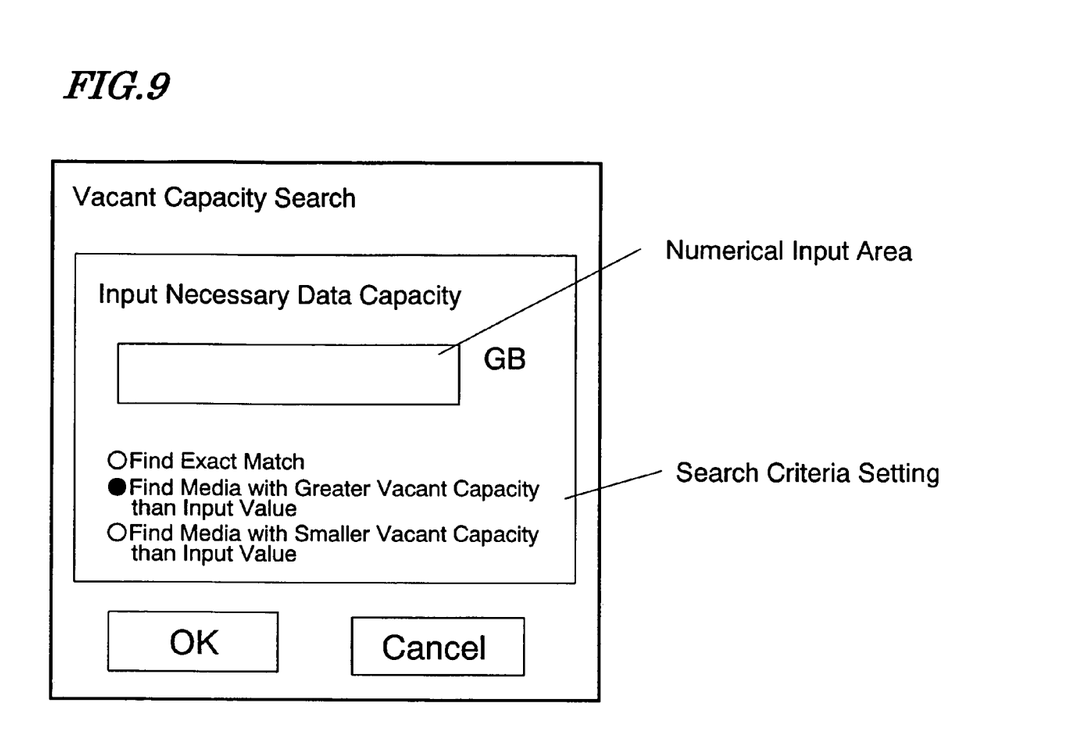
FIG. 9 is a diagram showing a GUI for vacant capacity searching according to an embodiment of the present invention.

Next, with reference to FIGS. 9 and 10, a vacant capacity search process for the information storage medium will be described. FIG. 9 shows a GUI for vacant capacity searching, which is displayed on the display device 131 (FIG. 1). The data for displaying the GUI for vacant capacity search is output from the search section 112 (FIG. 1) of the information recording apparatus 101 to the display device 131, via the output section 107. In a numerical input area, the user will input a data capacity which is necessary for the piece of content data that the user wishes to copy or move, and also sets search criteria.

The management information storage section 110 stores copy/move management information concerning each of a plurality of information storage media. In the copy/move management information stored in the management information storage section 110, the search section 112 searches for a piece of information which indicates the vacant capacity of each information storage medium. The search section 112 functions also as a vacant capacity information generation section for generating vacant capacity information to be used for displaying the vacant capacities of any information storage media that satisfy the search criteria in a predetermined order. In the case where the aforementioned updating process for copy/move management information is performed, the vacant capacities of the information storage media will be accurately reflected by the copy/move management information, so that an accurate vacant capacity search can be performed.

Figure 10:
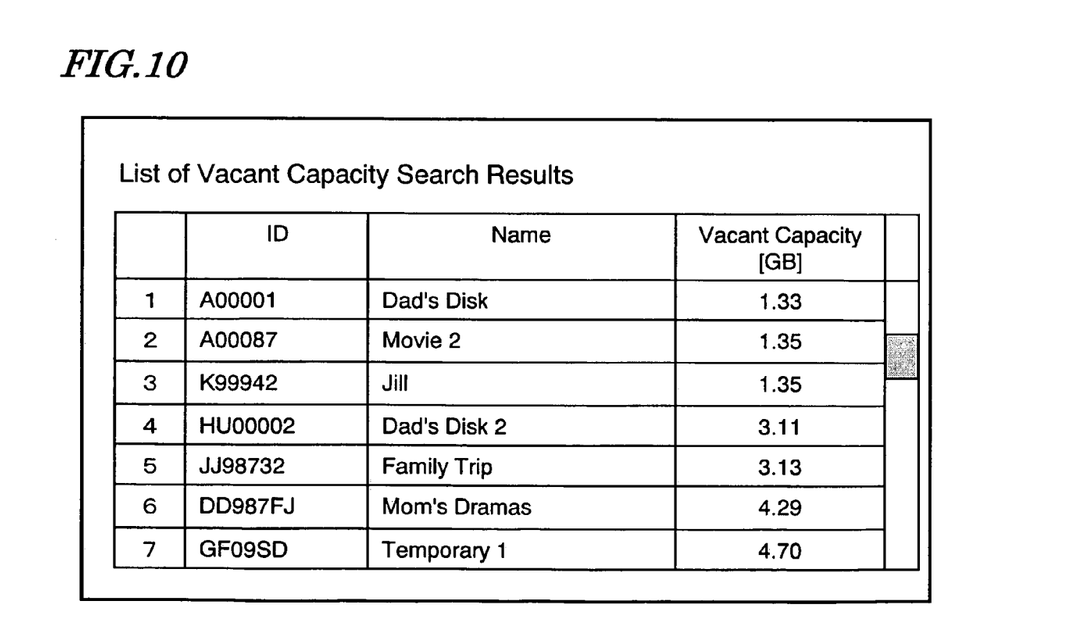
FIG. 10 is a diagram showing vacant capacity information according to an embodiment of the present invention, which is displayed as a GUI.

FIG. 10 shows an example of vacant capacity information which is displayed on the display device 131 as a GUI. In the GUI shown in FIG. 10, the information storage media which are capable of accommodating content data of a desired data capacity are displayed in ascending order of vacant capacity. Any arbitrary displaying order may be adopted; for example, a descending order of vacant capacity may instead be adopted. Thus, by confirming the vacant capacity information, the user can easily identify the information storage media to which desired content data can be copied or moved.

Note that, instead of inputting in the numerical input area the data capacity necessary for a given piece of content data, the user may designate a piece of content data to be copied or moved. In this case, the search section 112 automatically detects the data capacity of the designated content data, and searches for any information storage media that satisfy the search criteria.

In the above embodiment, the information recording apparatus 101 is illustrated as a non-portable type apparatus. Alternatively, any information recording apparatus other than those which are non-portable may be used, e.g., a DVD camera, a mobile phone, or a portable video reproduction apparatus.

The content data storage section 105 and the management information storage section 110 may be the same information storage medium. Moreover, each of the content data storage section 105 and the management information storage section 110 may be any information storage medium other than an HDD (e.g., an optical disk medium, a semiconductor memory, or a magnetic tape medium).

The constituent elements of the information recording apparatus 101 are to be implemented in the form of an electronic circuit. However, at least some of the constituent elements may be realized as a program which is executable on a computer.

The information recording apparatus according to the present invention is particularly useful in any field of technology where copying and moving of content data is performed.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2005-011204 filed on Jan. 19, 2005 and No. 2006-006201 filed on Jan. 13, 2006, the entire contents of which are hereby incorporated by reference.

What is claimed is:

1. An information recording apparatus comprising:
a content data storage section for recording content data;
a management information generation section for generating management information for the management of at least one of a copy and move of the content data; and
a management information storage section for recording the management information, wherein,
when the content data is copied or moved from the information recording apparatus to an information storage medium which is separate or separable from the information recording apparatus, the management information generation section generates management information containing: content data identification information for specifically identifying the copied or moved content data as copied or moved; and information storage medium identification information for identifying the information storage medium to which the content data specifically identified as copied or moved has been copied or moved.

2. The information recording apparatus of claim 1, wherein, even after the content data is deleted from the content data storage section, the management information storage section retains the management information concerning the content data.

3. The information recording apparatus of claim 1, further comprising a detection section for detecting a state of content data recorded on the information storage medium, wherein,
when the detected state of the content data differs from what is described in the management information, the management information generation section updates the management information so as to reflect the detected state of the content data.

4. The information recording apparatus of claim 1, wherein,
the management information indicates a vacant capacity of the information storage medium; and
the information recording apparatus further comprises a vacant capacity information generation section for, when the management information storage section stores management information concerning each of a plurality of information storage media, generating vacant capacity information for displaying the respective vacant capacities of the information storage media in a predetermined order.

5. The information recording apparatus of claim 1, further comprising a content data management information generation section for generating content data management information for the management of content data, wherein
the content data management information includes information indicating whether the content data has ever been copied or not and a number of instances of copying the content data.

6. The information recording apparatus of claim 1, further comprising a content data management information generation section for generating content data management information for the management of content data, wherein
the content data management information includes information indicating whether the content data has ever been moved or not.

7. The information recording apparatus of claim 1, wherein the management information indicates at least one of:
a date and time of copying or moving the content data to the information storage medium;
a format type of the content data after being copied or moved;
a representative still picture representing a portion of the content data;
representative moving pictures representing a portion of the content data;
a type of the information storage medium;
a vacant capacity of the information storage medium; and
a number of content data recorded on the information storage medium.

8. The information recording apparatus of claim 1, wherein the information storage medium identification information includes at least one of text, a symbol, and an icon having been arbitrarily set by a user.

9. The information recording apparatus of claim 1, further comprising an output section for outputting the management information to outside of the information recording apparatus.

* * * * *